(No Model.)  3 Sheets—Sheet 1.
J. L. FOWLE.
MACHINE FOR MILLING THE ENDS OF BAND SAWS.

No. 369,930. Patented Sept. 13, 1887.

Witnesses.
S. N. Piper.
R. B. Torrey

Inventor
John L. Fowle.
by R. H. Eddy atty.

(No Model.) 3 Sheets—Sheet 2.

J. L. FOWLE.
MACHINE FOR MILLING THE ENDS OF BAND SAWS.

No. 369,930. Patented Sept. 13, 1887.

Witnesses
S. N. Piper
R. B. Torrey

Inventor
John L. Fowle
by R. H. Eddy atty.

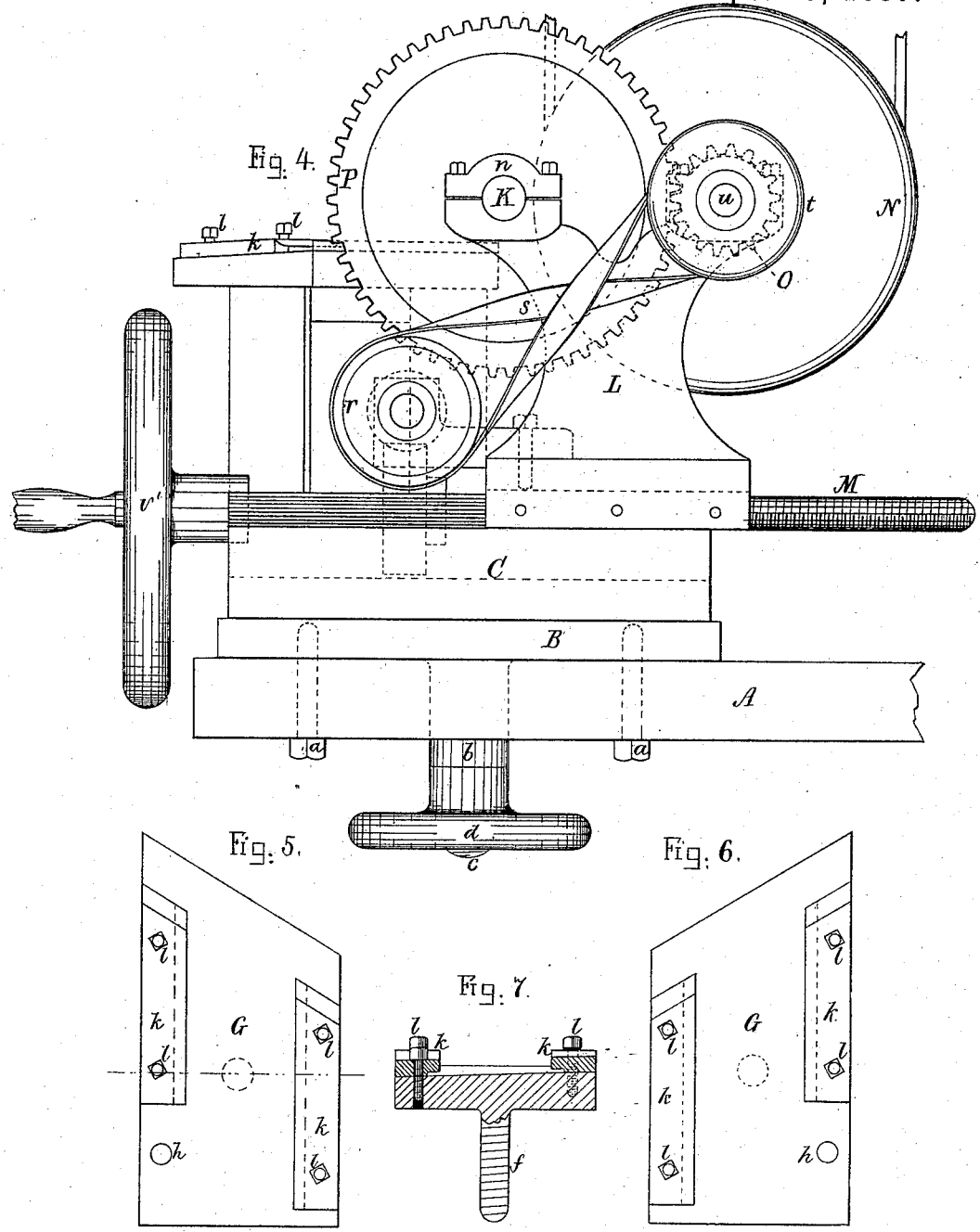

UNITED STATES PATENT OFFICE.

JOHN LEONARD FOWLE, OF WOBURN, MASSACHUSETTS, ASSIGNOR TO WALTER F. FOWLE, OF SAME PLACE.

MACHINE FOR MILLING THE ENDS OF BAND-SAWS.

SPECIFICATION forming part of Letters Patent No. 369,930, dated September 13, 1887.

Application filed April 25, 1887. Serial No. 236,039. (No model.)

*To all whom it may concern:*

Be it known that I, JOHN LEONARD FOWLE, of Woburn, in the county of Middlesex, of the Commonwealth of Massachusetts, have invented a new and useful Improvement in Machinery for Milling or Rabbeting the End Parts of Metallic Belts or Band Knives or Saws for Scarfing them together; and I do hereby declare the same to be described in the following specification and represented in the accompanying drawings, of which—

Figure 1:
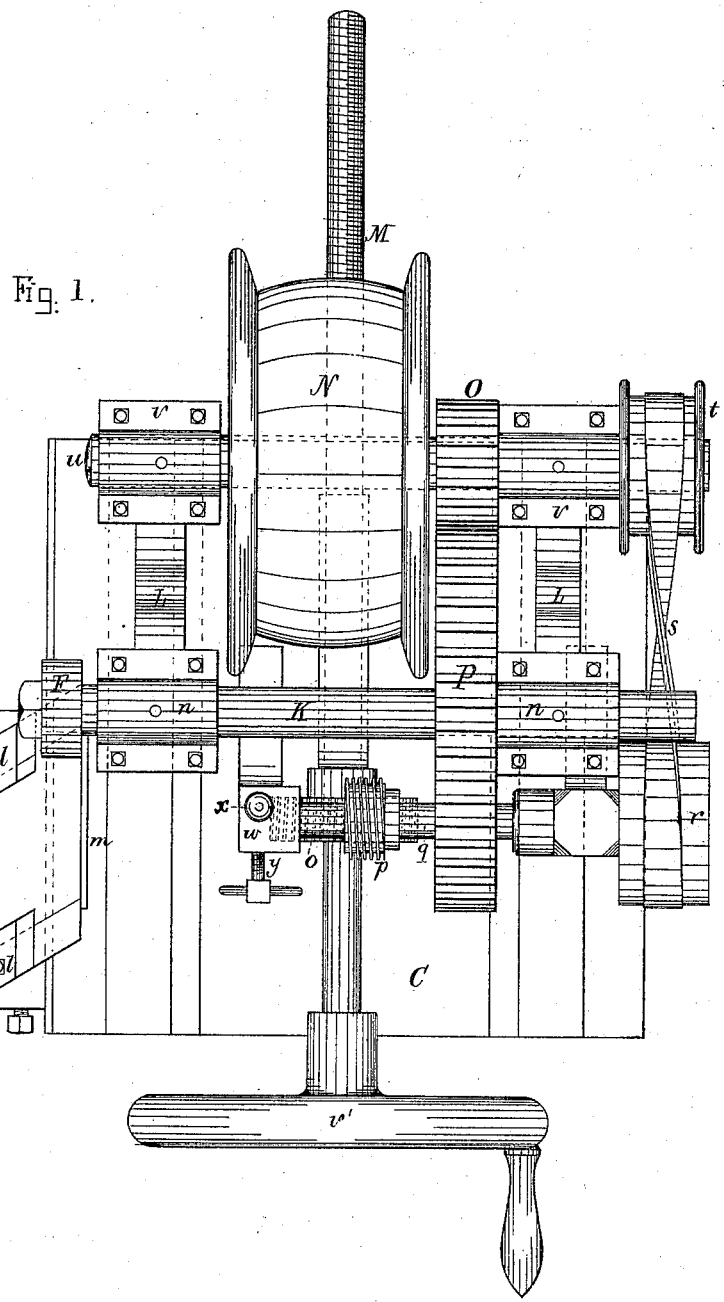

Figure 1 is a top view, Fig. 2 a front elevation, Fig. 3 a longitudinal section, and Fig. 4 a side elevation, of a machine embodying my invention, the nature of which is defined in the claims hereinafter presented. Figs. 5 and 6 are top views of the band-end holders, Fig. 7 being a transverse and median section of one of them—viz., that shown in Fig. 5.

In the drawings the top of a bench is shown at A as having fastened to it and upon it by screws $a\ a$ a flat metallic disk or plate, B, provided at its central part with a tubular stem, $b$, which extends down through the part A of the bench. Resting on such plate B is the main frame C of the machine, such frame being revoluble horizontally on the plate B and held thereto by a clamp screw-bolt, $c$, and a hand-nut, $d$, the latter being screwed on the bolt, which goes down through the base $e$ of the frame C, and also through the stem $b$.

The frame C has applied to it a vertically-movable table, D, provided with a screw, E, for effecting its adjustment in altitude relatively to the milling or rabbeting cutter F, such screw being screwed into the table and revoluble in a projection, $z$, connected with the frame C. (See Fig. 2.)

Figure 2:
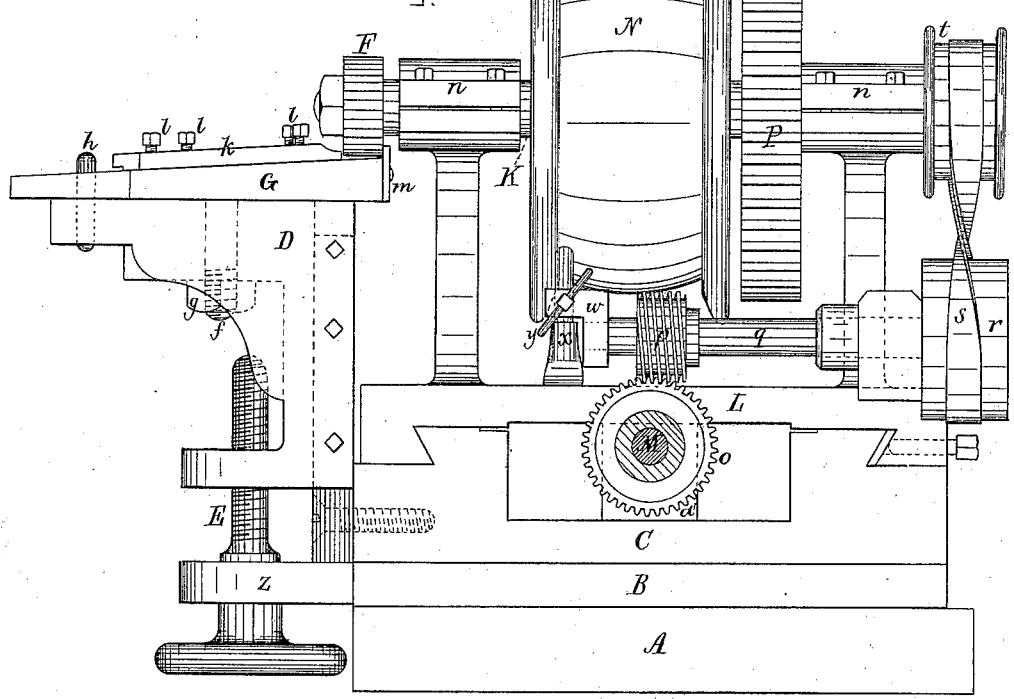
Figure 3:
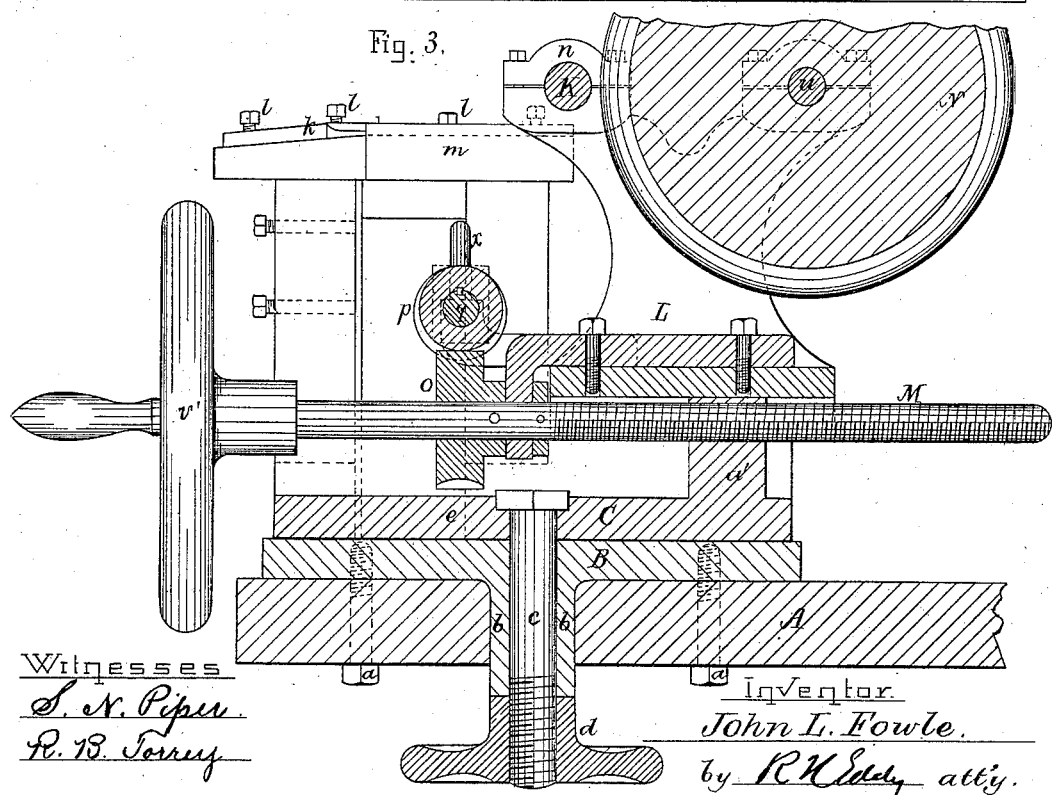

One of the band-end holders G and G' is shown at G in Figs. 1 and 2 as placed obliquely on the top of the table D, it being clamped thereto by a screw, $f$, and nut $g$, the said screw being extended from the holder through the top part of the table. (See Fig. 2, in which the screw is shown in part by dotted lines.) A stud, $h$, (see Figs. 1 and 2,) projecting from the holder down through a hole in the table, serves to determine the obliquity of the holder. There is in the table another such hole, which (shown at $i$ in Fig. 1) is to receive the stud $h$ of the holder G' when the latter is on the table. Each holder is a plate provided with two rabbeted clamps, $k$, arranged on it, as represented, and secured to it by set-screws $l$, going down through them and screwed into the plate. An abutment, $m$, for the end of the saw-band to rest against, is fastened to and extended above the inner end of each of the holders. (See Figs. 1, 2, and 3.) The end portion of the said band to be milled or rabbeted is shown at I in Fig. 1 as inserted in and fixed to the holder G and extended underneath the rotary milling tool or cutter F, which, in order to rabbet the said end portion, is to be rapidly revolved and at the same time moved rectilinearly across it, the groove or rabbet produced being deeper at the extreme end of the band, owing to the top of the holder G being inclined, as shown in Fig. 2. The said cutter F is mounted upon a horizontal shaft, K, supported in boxes $n\ n$ of a sliding carriage, L, adapted to move rectilinearly upon the frame C, and provided with mechanism for so moving it, (the said carriage,) such being a screw, M, screwed through a part, $a'$, of the frame C, (see Fig. 3,) a worm-gear, $o$, fixed on the screw, a worm, $p$, engaging with the said gear and fastened on a shaft, $q$, a pulley, $r$, carried by such shaft $q$, and a crossed endless belt, $s$, going about such pulley and another pulley, $t$, fixed on a shaft, $u$, revoluble in boxes $v\ v$ of the carriage L.

Secured on the shaft $u$ are a driving-pulley, N, and a pinion, O, the latter engaging with a gear, P, carried by the shaft K. On the pulley N being revolved not only will the milling or rabbeting cutter F be put in rapid revolution, but it will be moved rectilinearly across the band portion and will perform the operation of rabbeting it. The frame C is revoluble horizontally on the plate B, in order to enable such frame to be turned into a proper position relatively to the band to be applied to and cut by it. On each end of the band being suitably rabbeted the two ends are to be laid or scarfed together and connected by rivets and solder or brazing.

In order to allow the screw M to be revolved by manual power applied to a crank-wheel fixed on each screw, it becomes necessary that the worm $p$ should have means for enabling it to be raised out of engagement with the worm-gear o. For this purpose the shaft q of the worm is journaled at one end in a box, w, movable vertically on a stationary post, x, said box having applied to it and the post a set-screw, y, all being as shown in Figs. 1 and 2.

I claim—

1. The machine, substantially as described, consisting of the frame C, the carriage L, movable rectilinearly on such frame and having mechanism for so moving it, the table D, supported by such frame and provided with mechanism for vertically moving it, (the said table,) the band-holder G, arranged on and applied to such table, as described, and the rotary cutter F, having its shaft supported by the frame L and provided with mechanism for revolving it, all being for use in manner and for the purpose essentially as explained.

2. The combination of the support-plate B with the mechanism, substantially as described, applied to it by means essentially as set forth, by which it (the said machine) may be revolved on and clamped to such plate, the said machine consisting of the frame C, the carriage L, movable rectilinearly in such frame and having mechanism for so moving it, the table D, applied to such frame and having mechanism for vertically adjusting it, (the said table,) as described, the band-holder G, arranged on and applied to such table, as explained, and the rotary cutter F, having its shaft supported by the said frame L and provided with mechanism for revolving it, all being for use essentially in manner and for the purpose as represented.

JOHN LEONARD FOWLE.

Witnesses:
R. H. EDDY,
R. B. TORREY.